United States Patent
Ishii et al.

(10) Patent No.: US 8,440,756 B2
(45) Date of Patent: May 14, 2013

(54) FLAME-RETARDANT POLYAMIDE RESIN COMPOSITION

(75) Inventors: Kentaro Ishii, Kanagawa (JP); Hisayuki Kuwahara, Kanagawa (JP); Shun Ogawa, Kanagawa (JP); Shinichi Ayuba, Kanagawa (JP); Takahiko Sumino, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 13/395,541

(22) PCT Filed: Sep. 14, 2010

(86) PCT No.: PCT/JP2010/065879
§ 371 (c)(1),
(2), (4) Date: Mar. 12, 2012

(87) PCT Pub. No.: WO2011/030911
PCT Pub. Date: Mar. 17, 2011

(65) Prior Publication Data
US 2012/0172512 A1    Jul. 5, 2012

(30) Foreign Application Priority Data
Sep. 14, 2009   (JP) ................................. 2009-211834

(51) Int. Cl.
C08K 5/03 (2006.01)
(52) U.S. Cl.
USPC ............................. 524/469; 524/464; 524/470
(58) Field of Classification Search .................. 524/464, 524/469, 470
See application file for complete search history.

(56) References Cited

U.S. PATENT DOCUMENTS

| 6,291,633 | B1 | 9/2001 | Nakamura |
| 6,359,055 | B1 | 3/2002 | Delannoy et al. |
| 2005/0044868 | A1 | 3/2005 | Kobayashi et al. |
| 2008/0039568 | A1 | 2/2008 | Maruyama et al. |
| 2008/0262193 | A1 | 10/2008 | Kurose et al. |
| 2010/0063191 | A1 | 3/2010 | Hirono |
| 2011/0196080 | A1 | 8/2011 | Matsuoka et al. |
| 2011/0224370 | A1 | 9/2011 | Kanda et al. |
| 2011/0245454 | A1 | 10/2011 | Kuwahara et al. |
| 2012/0065327 | A1 | 3/2012 | Ogawa et al. |

FOREIGN PATENT DOCUMENTS

| CN | 1898331 | 7/2007 |
| EP | 2 025 718 | 2/2009 |
| JP | 47 15106 | 5/1972 |
| JP | 49 35358 | 9/1974 |
| JP | 5 117524 | 5/1993 |
| JP | 5 170897 | 7/1993 |
| JP | 6 192416 | 7/1994 |
| JP | 2000 204240 | 7/2000 |
| JP | 2004 131544 | 4/2004 |
| JP | 2007 291250 | 11/2007 |
| JP | 2008 214526 | 9/2008 |
| JP | 2008 280535 | 11/2008 |
| JP | 2009 035656 | 2/2009 |
| JP | 2009 161748 | 7/2009 |
| TW | 200909477 | 7/1997 |
| WO | 2008 053911 | 5/2008 |

OTHER PUBLICATIONS

International Search Report Issued Dec. 7, 2010 in PCT/JP10/65879 Filed Sep. 14, 2010.
U.S. Appl. No. 13/395,535, filed Mar. 12, 2012, Ogawa, et al.
U.S. Appl. No. 13/391,075, filed Feb. 17, 2012, Ishii, et al.
Office Action issued Feb. 4, 2013, Chineese Patent Application No. 201080040962.
European Search Report issued Feb. 4, 2013 in PCT/JP2010065879.

*Primary Examiner* — Peter Szekely
(74) *Attorney, Agent, or Firm* — Oblon, Spivak, McClelland, Maier & Neustadt, L.L.P.

(57) ABSTRACT

Disclosed is a flame-retardant polyamide resin composition, including: a polyamide (A) containing a diamine unit including 70 mol % or more of a p-xylylenediamine unit and a dicarboxylic acid unit including 70 mol % or more of a linear aliphatic dicarboxylic acid unit having 6 to 18 carbon atoms; an organic halogen compound (B) that serves as a flame retardant; an inorganic compound (C) that serves as a flame retardant aid; and an inorganic filler (D), in which the polyamide (A) includes a polyamide having a phosphorus atom concentration of 50 to 1,000 ppm and a YI value of 10 or less in a color difference test in accordance with JIS-K-7105, and a content of the organic halogen compound (B), a content of the inorganic compound (C), and a content of the inorganic filler (D) are 1 to 100 parts by mass, 0.5 to 50 parts by mass, and 0 to 100 parts by mass, respectively, with respect to 100 parts by mass of the polyamide (A).

20 Claims, No Drawings

FLAME-RETARDANT POLYAMIDE RESIN COMPOSITION

TECHNICAL FIELD

The present invention relates to a flame-retardant polyamide resin composition, and more specifically, to a flame-retardant polyamide resin composition including: a polyamide resin containing a p-xylylenediamine unit and a linear aliphatic dicarboxylic acid unit having 6 to 18 carbon atoms as major components; and a specific amount of an additive.

BACKGROUND ART

An aliphatic polyamide typified by nylon 6 or nylon 66 has excellent properties such as heat resistance, chemical resistance, rigidity, abrasion resistance, and moldability, and hence is used for a variety of applications as an engineering plastic. In electrical and electronic fields, the aliphatic polyamide is required to have high flame retardance based on a UL94 standard, and hence many methods of imparting flame retardance using a variety of flame retardants have been proposed and put to practical use. However, such aliphatic polyamide has high water absorbability, and hence there causes a problem in that a molded article produced from the polyamide changes in dimension and reduces in its physical properties. Further, in recent years, in the electrical and electronic fields which require imparting of flame retardance, a method called surface mount technology (SMT) has been rapidly spread for the purposes of high-density mounting of parts, promotion of the efficiency of a soldering step, and the like. Therefore, the conventional resin has become ineffective in terms of heat resistance as well.

Meanwhile, recently, a semi-aromatic polyamide which contains, as a major component, a polyamide formed of 1,6-hexanediamine and terephthalic acid and is called 6T polyamide has also been used in the electrical and electronic fields which require flame retardance. For example, Patent Documents 1 and 2 each propose a technology for imparting flame retardance to a semi-aromatic polyamide such as the 6T polyamide.

However, the polyamide formed of 1,6-hexanediamine and terephthalic acid has a melting point of about 370° C., and hence cannot be used actually because melt polymerization and melt molding need to be carried out at a temperature equal to or higher than a polymer degradation temperature. Therefore, in actual use, adipic acid, isophthalic acid, ε-caprolactam, or the like is copolymerized at about 30 to 40 mol % to prepare a polyamide having a composition to achieve a melting point as low as about 320° C. which falls within a temperature range that enables actual use of the polyamide. Such copolymerization of a third component or a fourth component is effective for lowering the melting point, but may lead to lowering of a crystallization rate and a final crystallization degree. As a result, not only physical properties such as rigidity, chemical resistance, and dimensional stability at high temperature are lowered, but also productivity may be lowered due to elongation of a molding cycle. Further, changes in physical properties such as dimensional stability caused by water absorption are modestly improved through the introduction of an aromatic group compared to the conventional polyamide, but the problem has not been solved actually.

CITATION LIST

Patent Literature
  [Patent Document 1] JP 3-239755 A
  [Patent Document 2] JP 4-96970 A

SUMMARY OF INVENTION

Technical Problem
  A problem to be solved by the present invention is to provide a flame-retardant polyamide resin composition excellent in physical properties such as moldability, mechanical properties, heat resistance, and low water absorbability.
Solution to Problem
  The inventors of the present invention have made intensive studies. As a result, the inventors have found out that a flame-retardant polyamide resin composition excellent in the above-mentioned performances can be obtained by blending specific amounts of a flame retardant, a flame retardant aid, and a reinforcement in a polyamide formed of a diamine component containing p-xylylenediamine as a major component and a dicarboxylic acid component containing a linear aliphatic dicarboxylic acid having 6 to 18 carbon atoms as a major component, and thus attained the present invention.
  The present invention relates to the following items [1] and [2].

[1] A flame-retardant polyamide resin composition, comprising: a polyamide (A) containing a diamine unit including 70 mol % or more of a p-xylylenediamine unit and a dicarboxylic acid unit including 70 mol % or more of a linear aliphatic dicarboxylic acid unit having 6 to 18 carbon atoms; an organic halogen compound (B) that serves as a flame retardant; an inorganic compound (C) that serves as a flame retardant aid; and an inorganic filler (D), wherein the polyamide (A) comprises a polyamide having a phosphorus atom concentration of 50 to 1,000 ppm and a YI value of 10 or less in a color difference test in accordance with JIS-K-7105, and a content of the organic halogen compound (B), a content of the inorganic compound (C), and a content of the inorganic filler (D) are 1 to 100 parts by mass, 0.5 to 50 parts by mass, and 0 to 100 parts by mass, respectively, with respect to 100 parts by mass of the polyamide (A).

[2] A molded article, comprising the flame-retardant polyamide resin composition according to the item [1].

Advantageous Effects of Invention
  The flame-retardant polyamide resin composition of the present invention is excellent not only in flame retardance but also in a variety of physical properties such as moldability, mechanical properties, heat resistance, and low water absorbability, and can be suitably used in a wide range of applications and conditions as a molding material for a variety of industries and industrial and household products such as electrical and electronic parts, automotive parts, and mechanical parts required to have flame retardance.

DESCRIPTION OF EMBODIMENTS

A flame-retardant polyamide resin composition of the present invention includes, as mentioned below, a polyamide (A) containing a diamine unit and a dicarboxylic acid unit, an organic halogen compound (B) that serves as a flame retardant, and an inorganic compound (C) that serves as a flame retardant aid, and as required, further includes an inorganic filler (D) that serves as a reinforcement. Herein, the diamine unit refers to a constituent unit derived from a raw material diamine component, and the dicarboxylic acid unit refers to a constituent unit derived from a raw material dicarboxylic acid component.

<Polyamide (A)>
  The polyamide (A) contains the diamine unit including 70 mol % or more of a p-xylylenediamine unit and the dicarboxylic acid unit including 70 mol % or more of a linear aliphatic dicarboxylic acid unit having 6 to 18 carbon atoms.

The p-xylylenediamine unit in the diamine unit is contained at a concentration of preferably 80 mol % or more, more preferably 90 mol % or more, most preferably 100 mol %. The linear aliphatic dicarboxylic acid unit having 6 to 18 carbon atoms in the dicarboxylic acid unit is contained at a concentration of preferably 80 mol % or more, more preferably 90 mol % or more, most preferably 100 mol %.

The polyamide (A) can be obtained by polycondensation of a diamine component including 70 mol % or more of p-xylylenediamine and a dicarboxylic acid component including 70 mol % or more of a linear aliphatic dicarboxylic acid having 6 to 18 carbon atoms.

The diamine component as a raw material of the polyamide (A) includes p-xylylenediamine at a concentration of 70 mol % or more, preferably 80 mol % or more, more preferably 90 mol % or more, particularly preferably 100 mol %. When the concentration of the p-xylylenediamine in the diamine component is adjusted to 70 mol % or more, a polyamide to be obtained exhibits a high melting point and high crystallinity and can be suitably used for a variety of applications as a polyamide being excellent in heat resistance, chemical resistance, and the like and having low water absorbability. If the concentration of p-xylylenediamine in the diamine component used as a raw material is less than 70 mol %, the polyamide to be obtained has lowered heat resistance and chemical resistance and increased water absorbability.

A raw material diamine component other than p-xylylenediamine may be exemplified by, but not limited to, an aliphatic diamine such as 1,4-butanediamine, 1,6-hexanediamine, 1,8-octanediamine, 1,10-decanediamine, 1,12-dodecanediamine, 2-methyl-1,5-pentanediamine, 2,2,4-trimethyl-1,6-hexanediamine, 2,4,4-trimethyl-1,6-hexanediamine, 2-methyl-1,8-octanediamine, or 5-methyl-1,9-nonanediamine, an alicyclic diamine such as 1,3-bis(aminomethyl)cyclohexane, 1,4-bis(aminomethyl)cyclohexane, cyclohexanediamine, methylcyclohexanediamine, or isophoronediamine, an aromatic diamine such as m-xylylenediamine, or a mixture thereof.

The dicarboxylic acid component as a raw material of the polyamide (A) includes the linear aliphatic dicarboxylic acid having 6 to 18 carbon atoms at a concentration of 70 mol % or more, preferably 80 mol % or more, more preferably 90 mol % or more, particularly preferably 100 mol %. When the concentration of the linear aliphatic dicarboxylic acid having 6 to 18 carbon atoms is adjusted to 70 mol % or more, a polyamide to be obtained exhibits fluidity in melt processing, high crystallinity, and low water absorption and can be suitably used for a variety of applications as a polyamide excellent in heat resistance, chemical resistance, molding processability, and dimensional stability. If the concentration of the linear aliphatic dicarboxylic acid having 6 to 18 carbon atoms in the dicarboxylic acid component used as a raw material is less than 70 mol %, the polyamide to be obtained has lowered heat resistance, chemical resistance, and molding processability.

Examples of the linear aliphatic dicarboxylic acid having 6 to 18 carbon atoms may include adipic acid, pimelic acid, suberic acid, azelaic acid, sebacic acid, undecanedioic acid, dodecanedioic acid, tridecanedioic acid, tetradecanedioic acid, pentadecanedioic acid, and hexadecanedioic acid. Of those, preferred is at least one selected from the group consisting of azelaic acid, sebacic acid, undecanedioic acid, and dodecanedioic acid, and particularly preferred are sebacic acid and/or azelaic acid. In the case where an aliphatic dicarboxylic acid having 5 or less carbon atoms is used, the dicarboxylic acid has a low melting point and a low boiling point, and hence is distilled out from the reaction system during polycondensation reactions to change a reaction molar ratio between the diamine and the dicarboxylic acid, resulting in low mechanical properties and thermal stability of a polyamide to be obtained. Meanwhile, in the case where an aliphatic dicarboxylic acid having 19 or more carbon atoms is used, the heat resistance cannot be obtained because the melting point of the polyamide is significantly lowered.

A raw material dicarboxylic acid other than the linear aliphatic dicarboxylic acid having 6 to 18 carbon atoms may be exemplified by, but not limited to, malonic acid, succinic acid, 2-methyladipic acid, trimethyladipic acid, 2,2-dimethylglutaric acid, 2,4-dimethylglutaric acid, 3,3-dimethylglutaric acid, 3,3-diethylsuccinic acid, 1,3-cyclopentanedicarboxylic acid, 1,3-cyclohexanedicarboxylic acid, 1,4-cyclohexanedicarboxylic acid, isophthalic acid, terephthalic acid, 2,6-naphthalenedicarboxylic acid, 1,5-naphthalenedicarboxylic acid, 1,4-naphthalenedicarboxylic acid, 2,7-naphthalenedicarboxylic acid, or a mixture thereof.

A lactam such as $\epsilon$-caprolactam or laurolactam, or an aliphatic aminocarboxylic acid such as aminocaproic acid or aminoundecanoic acid can also be used as a copolymerization component for constructing the polyamide (A) as well as the diamine components and the dicarboxylic acid components as long as an effect of the present invention is not impaired.

A small amount of a monofunctional compound having reactivity with a terminal amino group or a terminal carboxyl group of the polyamide may be added as a molecular weight modifier upon the polycondensation of the polyamide (A). Examples of the compound which can be used may include, but not limited to, aliphatic monocarboxylic acids such as acetic acid, propionic acid, butyric acid, valeric acid, caproic acid, caprylic acid, lauric acid, tridecylic acid, myristic acid, palmitic acid, stearic acid, and pivalic acid, aromatic monocarboxylic acids such as benzoic acid, toluic acid, and naphthalenecarboxylic acid, aliphatic monoamines such as butylamine, amylamine, isoamylamine, hexylamine, heptylamine, and octylamine, aromatic-aliphatic monoamines such as benzylamine and methylbenzylamine, and mixtures thereof.

In the case where a molecular weight modifier is used in polycondensation of the polyamide (A), a suitable amount of the molecular weight modifier used varies depending on, for example, the reactivity and boiling point of the molecular weight modifier used and reaction conditions, and is usually about 0.1 to 10% by mass with respect to the total of the diamine component and dicarboxylic acid component used as raw materials.

A phosphorus atom-containing compound may be added to a system of polycondensation of the polyamide (A) as an antioxidant for preventing coloring of the polyamide due to a catalyst for the polycondensation reaction and oxygen present in the polycondensation system.

Examples of the phosphorus atom-containing compound include alkaline earth metal salts of hypophosphorous acid, alkali metal salts of phosphorous acid, alkaline earth metal salts of phosphorous acid, alkali metal salts of phosphoric acid, alkaline earth metal salts of phosphoric acid, alkali metal salts of pyrophosphoric acid, alkaline earth metal salts of pyrophosphoric acid, alkali metal salts of metaphosphoric acid, and alkaline earth metal salts of metaphosphoric acid.

Specific examples thereof may include calcium hypophosphite, magnesium hypophosphite, sodium phosphite, sodium hydrogen phosphite, potassium phosphite, potassium hydrogen phosphite, lithium phosphite, lithium hydrogen phosphite, magnesium phosphite, magnesium hydrogen phosphite, calcium phosphite, calcium hydrogen phosphite, sodium phosphate, disodium hydrogen phosphate, sodium dihydrogen phosphate, potassium phosphate, dipotassium hydrogen phosphate, potassium dihydrogen phosphate, magnesium phosphate, dimagnesium hydrogen phosphate, magnesium dihydrogen phosphate, calcium phosphate, dicalcium hydrogen phosphate, calcium dihydrogen phosphate, lithium phosphate, dilithium hydrogen phosphate, lithium dihydrogen phosphate, sodium pyrophosphate, potassium pyrophosphate, magnesium pyrophosphate, calcium pyrophosphate, lithium pyrophosphate, sodium metaphosphate, potassium metaphosphate, magnesium metaphosphate, calcium metaphosphate, lithium metaphosphate, and mixtures thereof. Of those, preferred are calcium hypophosphite, magnesium hypophosphite, calcium phosphite, calcium hydrogen phosphite, and calcium dihydrogen phosphate, and more preferred is calcium hypophosphite. It should be noted that each of those phosphorus atom-containing compounds may be a hydrate.

The amount of the phosphorus atom-containing compound added to the system of polycondensation of the polyamide (A) is 50 to 1,000 ppm, preferably 50 to 400 ppm, more preferably 60 to 350 ppm, particularly preferably 70 to 300 ppm in terms of a phosphorus atom concentration in the polyamide (A). In the case where the phosphorus atom concentration in the polyamide (A) is less than 50 ppm, the effect of the compound as the antioxidant is not sufficient exerted, and the polyamide resin composition is liable to be colored. Meanwhile, in the case where the phosphorus atom concentration in the polyamide (A) is more than 1,000 ppm, a gelation reaction of the polyamide resin composition is promoted, and foreign matter probably due to the phosphorus atom-containing compound may be mixed in a molded article, which is liable to deteriorate the appearance of the molded article.

The phosphorus atom concentration in the polyamide (A) is preferably derived from at least one kind of phosphorus atom-containing compound selected from the group consisting of an alkaline earth metal salt of hypophosphorous acid, an alkali metal salt of phosphorous acid, an alkaline earth metal salt of phosphorous acid, an alkali metal salt of phosphoric acid, an alkaline earth metal salt of phosphoric acid, an alkali metal salt of pyrophosphoric acid, an alkaline earth metal salt of pyrophosphoric acid, an alkali metal salt of metaphosphoric acid, and an alkaline earth metal salt of metaphosphoric acid, more preferably derived from at least one kind of phosphorus atom-containing compound selected from the group consisting of calcium hypophosphite, magnesium hypophosphite, calcium phosphite, and calcium dihydrogen phosphate.

Further, a polymerization rate modifier is preferably added to the system of polycondensation of the polyamide (A) in combination with the phosphorus atom-containing compound. In order to prevent coloring of the polyamide during polycondensation, it is necessary that there be a sufficient amount of the phosphorus atom-containing compound. However, the compound may cause gelation of the polyamide, and hence in order to control a reaction rate of amidation as well, the polymerization rate modifier is preferably used together with the compound.

Examples of the polymerization rate modifier include alkali metal hydroxides, alkaline earth metal hydroxides, alkali metal acetates, and alkaline earth metal acetates. Of those, alkali metal hydroxides and alkali metal acetates are preferred. Examples of the polymerization rate modifier include lithium hydroxide, sodium hydroxide, potassium hydroxide, rubidium hydroxide, cesium hydroxide, magnesium hydroxide, calcium hydroxide, strontium hydroxide, barium hydroxide, lithium acetate, sodium acetate, potassium acetate, rubidium acetate, cesium acetate, magnesium acetate, calcium acetate, strontium acetate, barium acetate, and mixtures thereof. Of those, preferred are sodium hydroxide, potassium hydroxide, magnesium hydroxide, calcium hydroxide, sodium acetate, and potassium acetate, and more preferred are sodium hydroxide, sodium acetate, and potassium acetate.

In the case where the polymerization rate modifier is added to the polycondensation system, from the viewpoint of a balance between promotion and suppression of the amidation reaction, the molar ratio between a phosphorus atom in the phosphorus atom-containing compound and the polymerization rate modifier (=[molar number of polymerization rate modifier]/[molar number of phosphorus atom in phosphorus atom-containing compound]) is preferably 0.3 to 1.0, more preferably 0.4 to 0.95, particularly preferably 0.5 to 0.9.

A polymerization method for the polyamide (A) may be an arbitrary method such as: (a) polycondensation in a molten state; (b) so-called solid-phase polymerization involving producing a low-molecular-weight polyamide by polycondensation in a molten state and heat-treating the resultant polyamide in a solid-phase state; or (c) extrusion polymerization involving producing a low-molecular-weight polyamide by polycondensation in a molten state and increasing the molecular weight in a molten state using a kneading extruder.

The method for polycondensation in a molten state is not particularly limited, and examples thereof may include: a method involving conducting polycondensation in a molten state while removing water and condensation water by heating an aqueous solution of a nylon salt of a diamine component and a dicarboxylic acid component under increased pressure; and a method involving conducting polycondensation at ordinary pressure or in a pressurized steam atmosphere by directly adding a diamine component to a dicarboxylic acid in a molten state. In the case where polymerization is carried out by directly adding a diamine to a dicarboxylic acid in a molten state, polycondensation is carried out while controlling the reaction temperature so that the temperature is not lower than the melting points of an oligoamide and a polyamide to be generated by continuously adding the diamine component to a molten dicarboxylic acid phase to keep the reaction system to a uniform liquid state. In the case where, in production of a product by the above-mentioned polycondensation method, the inside of a device is washed because of, for example, a change in the type of the product, triethylene glycol, ethylene glycol, m-xylylenediamine, or the like may be used.

The polyamide obtained by melt polycondensation is taken out first, pelletized, and then dried before use. The polyamide may be produced by solid-phase polymerization to further increase a polymerization degree. As a heating device to be used for drying or solid-phase polymerization, a continuous heat drying device, a rotary drum heating device called tumble dryer, conical dryer, or rotary dryer, and a cone-shaped heating device equipped with a blade on its inside, called nautamixer are suitably used. However, the device is not limited thereto, and a known method and device may be used. In particular, in the case of conducting solid-phase polymerization of the polyamide, of the above-mentioned devices, a rotary drum heating device is preferably used because the system can be sealed to facilitate polycondensation in a state in which oxygen, which causes coloring, is removed.

The polyamide (A) is less colored and less gelatinized. Further, the polyamide (A) has a YI value of 10 or less, preferably 6 or less, more preferably 5 or less, still more preferably 1 or less, in a color difference test in accordance with JIS-K-7105. A molded article obtained from a resin composition containing a polyamide (A) having a YI value of more than 10 is not preferred because the article has a yellowish color and hence has low marketability.

Although there are some indices of the polymerization degree of a polyamide, a relative viscosity is generally used. The relative viscosity of the polyamide (A) is preferably 1.8 to 4.2, more preferably 1.9 to 3.5, still more preferably 2.0 to 3.0 from the viewpoints of the appearance and molding processability of the molded article. It should be noted that the relative viscosity as used herein is a ratio of a falling time (t), which is measured for a solution obtained by dissolving 1 g of a polyamide in 100 mL of 96% sulfuric acid at 25° C. using a Cannon-Fenske viscometer, to a falling time (t0), which is measured for 96% sulfuric acid itself in the same manner as above, and is represented by the following equation (1).

$$\text{Relative viscosity} = t/t0 \qquad (1)$$

The number average molecular weight (Mn) of the polyamide (A), which is determined by gel permeation chromatography (GPC) measurement, falls within the range of preferably from 10,000 to 50,000, more preferably from 12,000 to 40,000, still more preferably from 14,000 to 30,000. When the Mn is adjusted to the range, the mechanical strength of a molded article obtained from the polyamide is stabilized, and the polyamide has an appropriate melt viscosity necessary for satisfactory processability in terms of moldability.

Meanwhile, the dispersivity (weight average molecular weight/number average molecular weight=Mw/Mn) falls within the range of preferably from 1.5 to 5.0, more preferably from 1.5 to 3.5. When the dispersivity is adjusted to the range, fluidity in melting and stability of the melt viscosity are improved, resulting in satisfactory processability in melt kneading or melt molding. Further, the polyamide is satisfactory in toughness as well as some physical properties such as water absorption resistance, chemical resistance, and heat aging resistance.

<Organic Halogen Compound (B)>

Examples of the organic halogen compound (B) that serves as a flame retardant may include brominated polystyrene, brominated polyphenylene ether, brominated polycarbonate, a brominated bisphenol-type epoxy-based polymer, a brominated styrene maleic anhydride polymer, a brominated epoxy resin, a brominated phenoxy resin, decabromodiphenyl ether, decabromobiphenyl, a brominated crosslinked aromatic polymer, and perchlorocyclopentadecane. Of those, a bromine-based compound is preferred, and brominated polystyrene and brominated polyphenylene ether are particularly preferred from the viewpoints of flame retardance and thermal degradation resistance. The compounds may be used alone or in combination of two or more kinds thereof. A halogen atom content in the organic halogen compound (B) is preferably 15 to 87% by mass, more preferably 20 to 60% by mass from the viewpoints of flame retardance and thermal degradation resistance.

The content of the organic halogen compound (B) is 1 to 100 parts by mass, preferably 10 to 60 parts by mass with respect to 100 parts by mass of the polyamide (A). If the content of the organic halogen compound (B) is less than 1 part by mass with respect to 100 parts by mass of the polyamide (A), a flame-retardant effect is not obtained, while if the content exceeds 100 parts by mass with respect to 100 parts by mass of the polyamide (A), mechanical properties are significantly lowered.

<Inorganic Compound (C)>

Examples of the inorganic compound (C) that serves as a flame retardant aid may include antimony trioxide, antimony pentoxide, sodium antimonate, tin oxide, iron oxide, zinc oxide, zinc borate, magnesium hydroxide, calcium hydroxide, calcium carbonate, and kaolin clay. Of those, antimony trioxide, antimony pentoxide, and sodium antimonate are preferred from the viewpoints of flame retardance and thermal decomposition resistance. The compounds may be treated with, for example, a silane coupler or a titanium coupler, and may be used alone or in combination of two or more kinds thereof.

The content of the inorganic compound (C) is 0.5 to 50 parts by mass, preferably 1 to 30 parts by mass with respect to 100 parts by mass of the polyamide (A). If the content of the inorganic compound (C) is less than 0.5 part by mass with respect to 100 parts by mass of the polyamide (A), the flame-retardant effect is low, while if the content exceeds 50 parts by mass with respect to 100 parts by mass of the polyamide (A), mechanical properties are lowered, or the surface state of the molded article is deteriorated.

<Inorganic Filler (D)>

The flame-retardant polyamide resin composition of the present invention preferably contains the inorganic filler (D) that serves as a reinforcement from the viewpoints of mechanical properties and moldability. Examples of the inorganic filler (D) may include a glass fiber, glass beads, a carbon fiber, a boron fiber, talc, mica, silica, silica alumina, alumina, graphite, kaolin, titanium dioxide, and molybdenum disulfide. Of those, a glass fiber and a carbon fiber are preferred from the viewpoints of mechanical strength and moldability. The fillers may be used alone or in combination of two or more kinds thereof.

The content of the inorganic filler (D) is preferably 0 to 100 parts by mass, more preferably 10 to 100 parts by mass, particularly preferably 50 to 100 parts by mass with respect to 100 parts by mass of the polyamide (A) from the viewpoint of a balance between mechanical properties and moldability.

The flame-retardant polyamide resin composition of the present invention may contain, as a component other than the above-mentioned components, a hindered phenol-based antioxidant, a hindered amine-based antioxidant, a thio-based antioxidant, a colorant, an ultraviolet absorber, a light stabilizer, an antistat, a plasticizer, a lubricant, and a nucleating agent, if necessary.

Further, in the polyamide resin composition of the present invention, a heat-resistant resin may be blended as long as the effect of the present invention is not impaired. Examples of the heat-resistant resin which may be blended include heat-resistant thermoplastic resins such as polyphenylene ether (PPE), polyphenylene sulfide, modified polyolefin, polyether sulfone (PES), polyether imide (PEI), and a molten liquid crystal polymer, and modified products of the resins. In the case where the polyamide resin composition of the present invention is a resin composition for a sliding part, from the viewpoints of sliding property and mechanical properties of a molded article, the composition preferably contains such thermoplastic resin having a high melting point.

(Polyphenylene Sulfide)

Polyphenylene sulfide which may be blended in the polyamide resin composition of the present invention is a polymer having a structural unit represented by the following general formula (I) at a concentration of 70 mol % or more, preferably 90 mol % or more in total structural units.

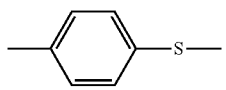
(I)

Examples of the polyphenylene sulfide which may be blended in the polyamide resin composition of the present invention may include a polymer having only the structural unit represented by the general formula (I) as well as polymers having structural units represented by the following general formulae (II) to (VI), and the polymer may include one kind or two or more kinds of the units.

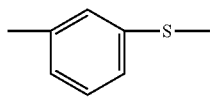
(II)

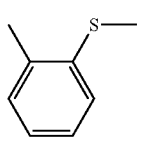
(III)

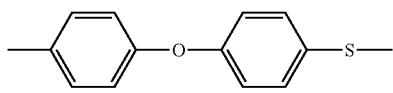
(IV)

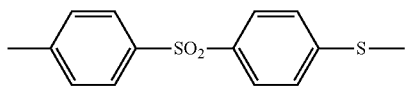
(V)

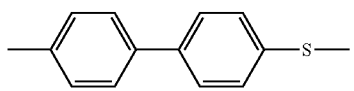
(VI)

The polyphenylene sulfide may further include a trifunctional structural unit represented by the following general formula (VII) at a concentration of 10 mol % or less in the total structural units.

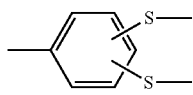
(VII)

The constituent units represented by the general formulae (I) to (VII) may each have a substituent such as an alkyl group, a nitro group, a phenyl group, or an alkoxyl group on its aromatic ring.

The viscosity of the polyphenylene sulfide which may be blended in the polyamide resin composition of the present invention, which is determined using a flow tester under a load of 20 kg at a temperature of 300° C., preferably falls within the range of preferably from 100 to 10,000 poise, more preferably from 200 to 5,000 poise, still more preferably from 300 to 3,000 poise. The polyphenylene sulfide may be prepared by an arbitrary method.

In the polyamide resin composition of the present invention, from the viewpoint of heat resistance, a mass ratio between the polyamide (A) and the polyphenylene sulfide is preferably 5:95 to 99.9:0.1, more preferably 5:95 to 95:5, still more preferably 20:80 to 80:20.

(Modified Polyolefin)

As the modified polyolefin, there may be used a product obtained by modification of a polyolefin with an α,β-unsaturated carboxylic acid or an ester or metal salt derivative thereof through copolymerization, or by graft introduction of, for example, a carboxylic acid or an acid anhydride to a polyolefin. Specific examples thereof may include, but not limited to, an ethylene/propylene copolymer, an ethylene/1-butene copolymer, an ethylene/4-methyl-1-pentene copolymer, an ethylene/1-hexene copolymer, an ethylene/1-octene copolymer, an ethylene/1-decene copolymer, a propylene/ethylene copolymer, a propylene/1-butene copolymer, a propylene/4-methyl-1-pentene copolymer, a propylene/1-hexene copolymer, a propylene/1-octene copolymer, a propylene/1-decene copolymer, a propylene/1-dodecene copolymer, an ethylene/propylene/1,4-hexadiene copolymer, an ethylene/propylene/dicyclopentadiene copolymer, an ethylene/1-butene/1,4-hexadiene copolymer, and an ethylene/1-butene/5-ethylidene-2-norbornene copolymer.

In the polyamide resin composition of the present invention, from the viewpoints of mechanical strength, impact resistance, heat resistance, and the like, the amount of the modified polyolefin blended is preferably 0.5 to 50 parts by mass, more preferably 1 to 45 parts by mass, still more preferably 5 to 40 parts by mass with respect to 100 parts by mass of the polyamide (A).

(Molten Liquid Crystal Polymer)

It is preferred that the molten liquid crystal polymer have property of forming a liquid crystal in a molten phase (that is, exhibiting optical anisotropy) and have an intrinsic viscosity [n], which is determined in pentafluorophenol at 60° C., of 0.1 to 5 dl/g.

Typical examples of the molten liquid crystal polymer may include, but not limited to: a polyester which is substantially formed of an aromatic hydroxycarboxylic acid unit; a polyester which is substantially formed of an aromatic hydroxycarboxylic acid unit, an aromatic dicarboxylic acid unit, and an aromatic diol unit; a polyester which is substantially formed of an aromatic hydroxycarboxylic acid unit, an aromatic dicarboxylic acid unit, and an aliphatic diol unit; a polyester amide which is substantially formed of an aromatic hydroxycarboxylic acid unit and an aromatic aminocarboxylic acid unit; a polyester amide which is substantially formed of an aromatic hydroxycarboxylic acid unit, an aromatic dicarboxylic acid unit, and an aromatic diamine unit; a polyester amide which is substantially formed of an aromatic hydroxycarboxylic acid unit, an aromatic aminocarboxylic acid unit, an aromatic dicarboxylic acid unit, and an aromatic diol unit; and a polyester amide which is substantially formed of an aromatic hydroxycarboxylic acid unit, an aromatic aminocarboxylic acid unit, an aromatic dicarboxylic acid unit, and an aliphatic diol unit.

Examples of the aromatic hydroxycarboxylic acid unit for constructing the molten liquid crystal polymer may include units derived from p-hydroxybenzoic acid, m-hydroxybenzoic acid, 6-hydroxy-2-naphthoic acid, 7-hydroxy-2-naphthoic acid, and the like.

Examples of the aromatic dicarboxylic acid unit may include units derived from terephthalic acid, isophthalic acid, chlorobenzoic acid, 4,4'-biphenyldicarboxylic acid, 2,6-naphthalenedicarboxylic acid, 2,7-naphthalenedicarboxylic acid, 4,4'-oxydibenzoic acid, diphenylmethane-4,4'-dicarboxylic acid, diphenylsulfone-4,4'-dicarboxylic acid, and the like.

Examples of the aromatic diol acid unit may include units derived from hydroquinone, resorcinol, methylhydroquinone, chlorohydroquinone, phenylhydroquinone, 4,4'-dihydroxybiphenyl, 2,6-dihydroxynaphthalene, 2,7-dihydroxynaphthalene, 4,4'-dihydroxybiphenyl ether, 4,4'-dihydroxybiphenylmethane, 4,4'-dihydroxybiphenyl sulfone, and the like.

Examples of the aliphatic diol acid unit may include units derived from ethylene glycol, propylene glycol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, and the like.

Examples of the aromatic aminocarboxylic acid unit may include units derived from p-aminobenzoic acid, m-aminobenzoic acid, 6-amino-2-naphthoic acid, 7-amino-2-naphthoic acid, and the like.

Examples of the aromatic diamine unit may include units derived from p-phenylenediamine, m-phenylenediamine, 4,4'-diaminobiphenyl, 2,6-diaminonaphthalene, 2,7-diaminonaphthalene, and the like.

Preferred examples of the molten liquid crystal polymer may include: a polyester which is formed of a p-hydroxybenzoic acid unit and a 6-hydroxy-2-naphthoic acid unit; a polyester which is formed of a p-hydroxybenzoic acid unit, a 4,4'-dihydroxybiphenyl unit, and a terephthalic acid unit; a polyester which is formed of a p-hydroxybenzoic acid unit, an ethylene glycol unit, and a terephthalic acid unit; and a polyester amide which is formed of a p-hydroxybenzoic acid unit, a 6-hydroxy-2-naphthoic acid unit, and p-aminobenzoic acid unit.

In the thermoplastic resin composition of the present invention, from the viewpoints of molding processability, dimensional stability and chemical resistance of a molded article, and the like, the amount of the molten liquid crystal polymer blended is preferably 0.1 to 200 parts by mass, more preferably 0.5 to 150 parts by mass, still more preferably 1 to 100 parts by mass with respect to 100 parts by mass of the polyamide (A).

A production method for the polyamide resin composition for a molding material of the present invention is not particularly limited, and the composition can be produced by: blending predetermined amounts of the polyamide (A), the organic halogen compound (B), the inorganic compound (C), and as required, the inorganic filler (D), another additive, and another resin; and melt-kneading the mixture. The melt-kneading can be carried out by a conventionally known method. For example, the melt-kneading may be carried out by feeding all materials using a mono-screw or twin-screw extruder, a Banbury mixer, or another device similar to them from the base of the extruder in one step; or a method involving: feeding resin components first; and kneading the components with melting together with a side-fed fibrous reinforcement may be carried out to produce pellets. Further, the method may be one which involves pelletizing different kinds of compound products and blending the resultant pellets, or one which involves separately blending part of a powder component or a liquid component.

<Molded Article>

The flame-retardant polyamide resin composition of the present invention is excellent not only in flame retardance but also in a variety of physical properties such as moldability, mechanical properties, heat resistance, chemical resistance, and low water absorbability, and can be suitably used in a wide range of applications and conditions as a molding material for electrical and electronic parts and other products required to have flame retardance. The flame-retardant polyamide resin composition of the present invention may be used to produce a molded product having a desired shape by a known molding method such as injection molding, blow molding, extrusion molding, compression molding, stretching, or vacuum molding.

EXAMPLES

Hereinafter, the present invention is described in more detail by way of Examples and Comparative Examples, but is not limited to the examples. It should be noted that measurement for a variety of items in the examples was carried out by the following methods.

(1) Relative Viscosity of Polyamide 1 g of a polyamide was weighed accurately and dissolved in 100 ml of 96% sulfuric acid with stirring at 20 to 30° C. After the polyamide was dissolved completely, 5 ml of the solution were immediately taken to a Canon-Fenske viscometer and allowed to stand in a thermostat bath at 25° C. for 10 minutes, and then a falling time (t) was measured. Meanwhile, a falling time (t0) of 96% sulfuric acid itself was measured in the same way as above. A relative viscosity was calculated from the t and t0 values by the following equation (1).

$$\text{Relative viscosity} = t/t0 \qquad (1)$$

(2) YI Value of Polyamide

In accordance with JIS-K-7105, a YI value was measured by a reflection method. A polyamide having a higher YI value is evaluated to be more colored in yellow. As a device for measurement of the YI value, a color difference measurement device manufactured by Nippon Denshoku Industries Co., Ltd. (type: Z-Σ80 Color Measuring System) was used.

(3) Phosphorus Atom Concentration

A phosphorus atom concentration was measured by a fluorescent X-ray analysis. As a measurement device, ZSX primus (tradename) manufactured by Rigaku Corporation was used. The analysis was carried out under conditions of: vacuum tube: Rh 4 kW; atmosphere: vacuum; analysis window: polyester film 5 μm; measurement mode: EZ scan; and measurement diameter: 30 mmϕ. Calculation was carried out by SQX calculation using software manufactured by Rigaku Corporation.

(4) Molecular Weight

A molecular weight was measured by gel permeation chromatography (GPC). As a measurement device, there was used a GPC device HLC-8320GPC (tradename) manufactured by TOSOH CORPORATION, to which were connected two columns TSKgel Super HM-H (tradename) manufactured by TOSOH CORPORATION as measurement columns. As a solvent, hexafluoroisopropanol (HFIP) was used, and 10 mg of a polyamide used as a sample was dissolved in 10 g of HFIP and used in measurement. Measurement was carried out under conditions of: column temperature: 40° C.; and solvent flow rate: 0.3 mL/min, and polymethyl methacrylate was used as a standard sample, to determine a number average molecular weight (Mn) and a weight average molecular weight (Mw).

(5) Flammability

A burn test was carried out in accordance with a standard of UL94V shown below. A test piece with a size of 125×13×6 mm was fixed vertically using a clamp, and dried absorbent cotton was placed on the lower side of the test piece. A predetermined flame was brought into contact with the lower end of the test piece, kept for 10 seconds in that state, and then taken away from the test piece, and a burning time (first flame contact) was measured. After fire extinguishing, a flame was brought into contact with the lower end of the test piece again for 10 seconds, and a burning time (second flame contact) was measured. For five test pieces, measurement was carried out to evaluate the test pieces to be V-0, V-1, or V-2, selected from the following classification.

TABLE 1

| Judgment criteria | Flammability classification | | |
|---|---|---|---|
| | V-0 | V-1 | V-2 |
| Burning time of each test piece | 10 seconds or less | 30 seconds or less | 30 seconds or less |
| Total burning time of five test pieces | 50 seconds or less | 250 seconds or less | 250 seconds or less |
| Red heat time after second flame contact | 30 seconds or less | 60 seconds or less | 60 seconds or less |
| Burning up to clamp | No | No | No |
| Ignition of absorbent cotton caused by flame-emitting droplet | No | No | Yes |

(6) Mechanical Properties of Molded Article

Mechanical properties of a molded article were measured under the following conditions.

TABLE 2

| Test item | Test method | Test piece dimension |
|---|---|---|
| Tensile strength | According to ISO527 | ISO3167 dumbbell piece |
| Tensile elastic modulus | Same as above | Same as above |
| Bending strength | According to ISO178 | 80 × 10 × 4 mm |
| Bending elastic modulus | Same as above | 80 × 10 × 4 mm |
| Charpy impact strength | According to ISO179 | 80 × 10 × 4 mm |
| High-temperature bending elastic modulus | According to ISO178, measured at 140° C. | 80 × 10 × 4 mm |
| Deflection temperature under load | According to ISO75 | 80 × 10 × 4 mm |

(7) Equilibrium Water Absorption

The absolute dry mass of a disk-shaped test piece (diameter 50 mm×thickness 3 mm) was weighed, and then the test piece was dipped in atmospheric boiling water. Changes of the mass were measured with time, and the water absorption at the time when no change in the mass was observed was determined as an equilibrium water absorption.

Synthesis Example 1

8,950 g (44.25 mol) of sebacic acid (manufactured by ITOH OIL CHEMICALS CO., LTD., tradename: Sebacic Acid TA), 12.54 g (0.073 mol) of calcium hypophosphite (manufactured by KANTO CHEMICAL CO., INC.), and 6.45 g (0.073 mol) of sodium acetate (KANTO CHEMICAL CO., INC.) were weighed accurately and fed to a reaction container having an inner volume of 50 L and equipped with a stirrer, a dephlegmator, a cooler, a thermometer, a dropping device, a nitrogen inlet tube, and a strand die (a molar ratio between a phosphorus atom in calcium hypophosphite and sodium acetate was 0.5). Air in the reaction container was sufficiently replaced with nitrogen, and the container was pressurized with nitrogen to 0.3 MPa and heated with stirring to 160° C. to melt sebacic acid uniformly. Subsequently, 6,026 g (44.25 mol) of p-xylylenediamine (manufactured by MITSUBISHI GAS CHEMICAL COMPANY, INC.) were added dropwise with stirring over 170 minutes. During this procedure, the inner temperature of the reaction container was raised continuously up to 281° C. In the dropping step, the pressure was controlled to 0.5 MPa, and generated water was removed to the outside of the system through the dephlegmator and cooler. The temperature of the dephlegmator was controlled so as to fall within the range of from 145 to 147° C. After completion of dropping of p-xylylenediamine, the pressure was reduced at a rate of 0.4 MPa/h to ordinary pressure over 60 minutes. During this procedure, the inner temperature was raised up to 300° C. After that, the pressure was reduced at a rate of 0.002 MPa/min to 0.08 MPa over 20 minutes. Subsequently, the reaction was continued at 0.08 MPa until the torque of the stirring device reached a predetermined value. After that, the system was pressurized with nitrogen, and a polymer was taken out from the strand die and pelletized, to thereby obtain about 13 kg of a polyamide (PA1).

Table 3 shows values of physical properties of the resultant polyamide (PA1). The polyamide (PA1) was found to have a phosphorus atom concentration of 315 ppm, a YI value of −6.5, a relative viscosity of 2.47, a number average molecular weight Mn of 21,000, and an Mw/Mn of 2.6.

Synthesis Example 2

Melt polycondensation was carried out in the same manner as in Synthesis Example 1 except that the kind and blending amount of the dicarboxylic acid were changed to 8,329 g (44.25 mol) of azelaic acid (manufactured by Cognis, tradename: EMEROX 1144), to thereby obtain a polyamide (PA2).

Table 3 shows values of physical properties of the resultant polyamide (PA1). The polyamide (PA2) was found to have a phosphorus atom concentration of 302 ppm, a YI value of −1.0, a relative viscosity of 2.22, a number average molecular weight Mn of 17,500, and an Mw/Mn of 2.5.

Synthesis Example 3

Melt polycondensation was carried out in the same manner as in Synthesis Example 1 except that the diamine component was changed to 5,423 g (39.82 mol) of p-xylylenediamine (manufactured by MITSUBISHI GAS CHEMICAL COMPANY, INC.) and 603 g (4.43 mol) of m-xylylenediamine (manufactured by MITSUBISHI GAS CHEMICAL COMPANY, INC.) (p-xylylenediamine and m-xylylenediamine accounted for 90 mol % and 10 mol % of the diamine component, respectively), to thereby obtain a polyamide (PA3).

Table 3 shows values of physical properties of the resultant polyamide (PA1). The polyamide (PA3) was found to have a phosphorus atom concentration of 300 ppm, a YI value of −2.0, a relative viscosity of 2.11, a number average molecular weight Mn of 17,200, and an Mw/Mn of 2.7.

Synthesis Example 4

Melt polycondensation was carried out in the same manner as in Synthesis Example 1 except that the amount of calcium hypophosphite blended was changed to 1.19 g (0.007 mol), and the amount of sodium acetate blended was changed to 0.57 g (0.007 mol) (a molar ratio between a phosphorus atom in calcium hypophosphite and sodium acetate was 0.5), to thereby obtain a polyamide (PA4). Table 3 shows values of physical properties of the resultant polyamide (PA4).

The polyamide (PA4) was found to have a phosphorus atom concentration of 28 ppm, a YI value of 25.0, a relative viscosity of 2.23, a number average molecular weight Mn of 18,000, and an Mw/Mn of 2.6.

Synthesis Example 5

Melt polycondensation was carried out in the same manner as in Synthesis Example 1 except that the amount of calcium hypophosphite blended was changed to 49.25 g (0.292 mol), and the amount of sodium acetate blended was changed to 23.95 g (0.292 mol) (a molar ratio between a phosphorus atom in calcium hypophosphite and sodium acetate was 0.5). In this case, the molecular weight increased rapidly during melt polymerization, and it was difficult to control the molecular weight.

Table 3 shows values of physical properties of the resultant polyamide (PA5). The polyamide (PA5) was found to have a phosphorus atom concentration of 1,210 ppm, a YI value of 0.5, a relative viscosity of 2.42, a number average molecular weight Mn of 40,000, and an Mw/Mn of 2.7.

Example 3

A test piece for evaluation was obtained in the same manner as in Example 1 except that the polyamide (PA1) was changed to the polyamide (PA3). For the resultant test piece, physical properties of the molded article were measured. Table 4 shows the results of the evaluation.

Example 4

A test piece for evaluation was obtained in the same manner as in Example 1 except that 30 parts by mass of brominated polystyrene were changed to 80 parts by mass of brominated polyphenylene ether (manufactured by ALBEMARLE JAPAN CORPORATION, tradename: SAYTEX102E, halogen atom content: 83% by mass). For the resultant test piece, physical properties of the molded article were measured. Table 4 shows the results of the evaluation.

Example 5

A test piece for evaluation was obtained in the same manner as in Example 4 except that the amount of brominated polyphenylene ether blended was changed from 80 parts by mass to 4 parts by mass. For the resultant test piece, physical properties of the molded article were measured. Table 4 shows the results of the evaluation.

Example 6

A test piece for evaluation was obtained in the same manner as in Example 1 except that 10 parts by mass of antimony trioxide were changed to 1 part by mass of antimony pentoxide (manufactured by NISSAN CHEMICAL INDUSTRIES, LTD., tradename: NA-1030). For the resultant test piece, physical properties of the molded article were measured. Table 4 shows the results of the evaluation.

Example 7

A test piece for evaluation was obtained in the same manner as in Example 6 except that 1 part by mass of antimony trioxide was changed to 40 part by mass of sodium antimonate. For the resultant test piece, physical properties of the molded article were measured. Table 4 shows the results of the evaluation.

TABLE 3

| | | Polyamide | | Phosphorus atom-containing compound | | Polymerization rate modifier | | Phosphorus atom concentration (ppm) | YI value | Relative viscosity | Number average molecular weight Mn | Mw/Mn |
|---|---|---|---|---|---|---|---|---|---|---|---|---|
| | | Dicarboxylic acid | Diamine | Name of substance | Addition amount (mol) | Name of substance | Addition amount (mol) | | | | | |
| Synthesis Example 1 | PA1 | Sebacic acid | PXDA | Calcium hypophosphite | 0.073 | Sodium acetate | 0.073 | 315 | −6.5 | 2.47 | 21,000 | 2.6 |
| Synthesis Example 2 | PA2 | Azelaic acid | PXDA | Calcium hypophosphite | 0.073 | Sodium acetate | 0.073 | 302 | −1.0 | 2.22 | 17,500 | 2.5 |
| Synthesis Example 3 | PA3 | Sebacic acid | PXDA/MXDA = 90/10 | Calcium hypophosphite | 0.073 | Sodium acetate | 0.073 | 300 | −2.0 | 2.11 | 17,200 | 2.7 |
| Synthesis Example 4 | PA4 | Sebacic acid | PXDA | Calcium hypophosphite | 0.007 | Sodium acetate | 0.007 | 28 | 25.0 | 2.23 | 18,000 | 2.6 |
| Synthesis Example 5 | PA5 | Sebacic acid | PXDA | Calcium hypophosphite | 0.292 | Sodium acetate | 0.292 | 1,210 | 0.5 | 2.42 | 40,000 | 2.7 |

PXDA: p-xylylenediamine
MXDA: m-xylylenediamine

Example 1

30 parts by mass of brominated polystyrene (manufactured by Nissan-Ferro Organic Chemical Company, Ltd., tradename: PyroChek 68PB, halogen atom content: 66% by mass) and 10 parts by mass of antimony trioxide (manufactured by Nihon Seiko Co., LTD., tradename: Padox C) were dry-blended in 100 parts by mass of the polyamide (PA1) which had been dried under reduced pressure at 150° C. for 7 hours. The mixture was fed to a base hopper of a twin-screw extruder (manufactured by TOSHIBA MACHINE CO., LTD., tradename: TEM37BS) at a rate of 8 kg/h, and extruded at a cylinder temperature of 280 to 300° C. and a screw rotation speed of 150 rpm, and side-feeding of 100 parts by mass of a glass fiber (manufactured by Nippon Electric Glass Co., Ltd., tradename: 03T-296 GH) with respect to 100 parts by mass of the polyamide (PA1) was carried out, to thereby prepare resin composition pellets. The resultant resin composition pellets were subjected to injection molding using an injection molding machine (manufactured by Sumitomo Heavy Industries, Ltd., tradename: SE130DU-HP) at a cylinder temperature of 300° C. and a mold temperature of 120° C., to thereby obtain a test piece for evaluation. For the resultant test piece, physical properties of the molded article were measured. Table 4 shows the results of the evaluation.

Example 2

A test piece for evaluation was obtained in the same manner as in Example 1 except that the polyamide (PA1) was changed to the polyamide (PA2). For the resultant test piece, physical properties of the molded article were measured. Table 4 shows the results of the evaluation.

Example 8

A test piece for evaluation was obtained in the same manner as in Example 1 except that the amount of the glass fiber blended was changed from 100 parts by mass to 50 parts by mass. For the resultant test piece, physical properties of the molded article were measured. Table 4 shows the results of the evaluation.

Example 9

A test piece for evaluation was obtained in the same manner as in Example 8 except that the glass fiber was changed to a PAN-based chopped carbon fiber. For the resultant test piece, physical properties of the molded article were measured. Table 4 shows the results of the evaluation.

Example 10

A test piece for evaluation was obtained in the same manner as in Example 1 except that the glass fiber was not blended. For the resultant test piece, physical properties of the molded article were measured. Table 4 shows the results of the evaluation.

Example 11

A test piece for evaluation was obtained in the same manner as in Example 1 except that the amount of brominated polyphenylene blended was changed from 30 parts by mass to 10 parts by mass, and the amount of antimony trioxide blended was changed from 10 parts by mass to 4 parts by mass. For the resultant test piece, physical properties of the molded article were measured. Table 4 shows the results of the evaluation.

Comparative Example 1

30 parts by mass of brominated polystyrene (manufactured by Nissan-Ferro Organic Chemical Company, Ltd., tradename: PyroChek 66PB) and 10 parts by mass of antimony trioxide (manufactured by Nihon Seiko Co., LTD., tradename: Padox C) were dry-blended in 100 parts by mass of a polyamide 6T (polyhexamethylene terephthalamide, manufactured by Solvay, tradename: Amodel). The mixture was fed to a base hopper of a twin-screw extruder (manufactured by TOSHIBA MACHINE CO., LTD., tradename: TEM37BS) at a rate of 8 kg/h, and extruded at a cylinder temperature of 300 to 340° C. and a screw rotation speed of 150 rpm, and side-feeding of 100 parts by mass of a glass fiber (manufactured by Nippon Electric Glass Co., Ltd., tradename: 03T-296GH) with respect to 100 parts by mass of the resin was carried out, to thereby prepare resin composition pellets. The resultant resin composition pellets were subjected to injection molding using an injection molding machine (manufactured by Sumitomo Heavy Industries, Ltd., tradename: SE130DU-HP) at a cylinder temperature of 340° C. and a mold temperature of 130° C., to thereby obtain a test piece for evaluation. For the resultant test piece, physical properties of the molded article were measured. Table 4 shows the results of the evaluation.

Comparative Example 2

30 parts by mass of brominated polystyrene (manufactured by Nissan-Ferro Organic Chemical Company, Ltd., tradename: PyroChek 66PB) and 10 parts by mass of antimony trioxide (manufactured by Nihon Seiko Co., LTD., tradename: Padox C) were dry-blended in 100 parts by mass of a polyamide 46 (polytetramethylene adipamide, manufactured by DSM, tradename: Stanyl). The mixture was fed to a base hopper of a twin-screw extruder (manufactured by TOSHIBA MACHINE CO., LTD., tradename: TEM37BS) at a rate of 8 kg/h, and extruded at a cylinder temperature of 290 to 310° C. and a screw rotation speed of 150 rpm, and side-feeding of 100 parts by mass of a glass fiber (manufactured by Nippon Electric Glass Co., Ltd., tradename: 03T-296GH) with respect to 100 parts by mass of the resin was carried out, to thereby prepare resin composition pellets. The resultant resin composition pellets were subjected to injection molding using an injection molding machine (manufactured by Sumitomo Heavy Industries, Ltd., tradename: SE130DU-HP) at a cylinder temperature of 310° C. and a mold temperature of 120° C., to thereby obtain a test piece for evaluation. For the resultant test piece, physical properties of the molded article were measured. Table 4 shows the results of the evaluation.

Comparative Example 3

A test piece for evaluation was obtained in the same manner as in Example 1 except that the polyamide (PA1) was changed to the polyamide (PA4). For the resultant test piece, physical properties of the molded article were measured. Table 4 shows the results of the evaluation.

Comparative Example 4

A test piece for evaluation was obtained in the same manner as in Example 1 except that the polyamide (PA1) was changed to the polyamide (PA5). For the resultant test piece, physical properties of the molded article were measured. Table 4 shows the results of the evaluation.

Comparative Example 5

A test piece for evaluation was obtained in the same manner as in Example 1 except that brominated polystyrene was not blended. For the resultant test piece, physical properties of the molded article were measured. Table 4 shows the results of the evaluation.

Comparative Example 6

A test piece for evaluation was obtained in the same manner as in Example 1 except that brominated polystyrene and antimony trioxide were not blended. For the resultant test piece, physical properties of the molded article were measured. Table 4 shows the results of the evaluation.

Comparative Example 7

A test piece for evaluation was obtained in the same manner as in Example 1 except that the amount of brominated polyphenylene blended was changed from 30 parts by mass to 150 parts by mass. For the resultant test piece, physical properties of the molded article were measured. Table 4 shows the results of the evaluation.

Comparative Example 8

A test piece for evaluation was obtained in the same manner as in Example 1 except that antimony trioxide was not blended. For the resultant test piece, physical properties of the molded article were measured. Table 4 shows the results of the evaluation.

Comparative Example 9

A test piece for evaluation was obtained in the same manner as in Example 1 except that the amount of antimony trioxide blended was changed from 10 parts by mass to 70 parts by mass. For the resultant test piece, physical properties of the molded article were measured. Table 4 shows the results of the evaluation.

Comparative Example 10

An attempt to prepare resin composition pellets was made in the same manner as in Example 1 except that the amount of the glass fiber blended was changed from 100 parts by mass to 250 parts by mass. However, it was impossible to prepare the resin composition pellets because fuzzy strands were formed.

TABLE 4

| | | Example | | | | |
|---|---|---|---|---|---|---|
| | | 1 | 2 | 3 | 4 | 5 |
| Polyamide (A) (parts by mass) | | PA1 100 | PA2 100 | PA3 100 | PA1 100 | PA1 100 |
| Organic halogen compound (B) (parts by mass) | Brominated polystyrene | 30 | 30 | 30 | — | — |
| | Brominated polyphenylene ether | — | — | — | 80 | 4 |
| Inorganic compound (C) (parts by mass) | Antimony trioxide | 10 | 10 | 10 | 10 | 10 |
| | Antimony pentoxide | — | — | — | — | — |
| | Sodium antimonate | — | — | — | — | — |
| Inorganic filler (D) (parts by mass) | Glass fiber | 100 | 100 | 100 | 100 | 100 |
| | Carbon fiber | — | — | — | — | — |
| Flame retardance | | V-0 | V-0 | V-0 | V-0 | V-1 |
| Physical properties of molded article | | | | | | |
| Tensile strength (MPa) | | 219 | 212 | 209 | 186 | 248 |
| Tensile elastic modulus (GPa) | | 17.6 | 17.2 | 17.5 | 15.2 | 18 |
| Bending strength (MPa) | | 364 | 336 | 311 | 321 | 372 |
| Bending elastic modulus (GPa) | | 14.7 | 14.5 | 14.3 | 12.8 | 15.2 |
| Charpy impact strength (kJ/m$^2$) | | 14.3 | 13 | 16 | 12.1 | 14.8 |
| High-temperature bending elastic modulus (GPa) | | 9.4 | 9.1 | 8.6 | 8.2 | 9.6 |
| Deflection temperature under load (° C.) | | 272 | 269 | 262 | 268 | 270 |
| Equilibrium water absorption (% by mass) | | 1.5 | 1.6 | 1.4 | 1.5 | 1.5 |

| | | Example | | | | | |
|---|---|---|---|---|---|---|---|
| | | 6 | 7 | 8 | 9 | 10 | 11 |
| Polyamide (A) (parts by mass) | | PA1 100 | PA1 100 | PA1 100 | PA1 100 | PA1 100 | PA1 100 |
| Organic halogen compound (B) (parts by mass) | Brominated polystyrene | 30 | 30 | 30 | 30 | 30 | 10 |
| | Brominated polyphenylene ether | — | — | — | — | — | — |
| Inorganic compound (C) (parts by mass) | Antimony trioxide | — | — | 10 | 10 | 10 | 4 |
| | Antimony pentoxide | 1 | — | — | — | — | — |
| | Sodium antimonate | — | 40 | — | — | — | — |
| Inorganic filler (D) (parts by mass) | Glass fiber | 100 | 100 | 50 | — | — | 100 |
| | Carbon fiber | — | — | — | 50 | — | — |
| Flame retardance | | V-1 | V-0 | V-0 | V-0 | V-1 | V-0 |
| Physical properties of molded article | | | | | | | |
| Tensile strength (MPa) | | 226 | 195 | 146 | 330 | 70 | 239 |
| Tensile elastic modulus (GPa) | | 17.8 | 15.8 | 10.5 | 25.9 | 3 | 18.3 |
| Bending strength (MPa) | | 368 | 336 | 239 | 384 | 117 | 370 |
| Bending elastic modulus (GPa) | | 14.6 | 13.1 | 9.1 | 21 | 2.1 | 15.2 |
| Charpy impact strength (kJ/m$^2$) | | 14.2 | 12.8 | 28.1 | 27.9 | 50 | 16 |
| High-temperature bending elastic modulus (GPa) | | 9.4 | 8.6 | — | — | — | 9.5 |

TABLE 4-continued

| | | | | | | |
|---|---|---|---|---|---|---|
| Deflection temperature under load (° C.) | 272 | 270 | 253 | 258 | 221 | 272 |
| Equilibrium water absorption (% by mass) | 1.4 | 1.5 | 1.8 | 1.8 | 2.8 | 1.5 |

| | | Comparative Example | | | | |
|---|---|---|---|---|---|---|
| | | 1 | 2 | 3 | 4 | 5 |
| Polyamide (A) (parts by mass) | | PA6T 100 | PA46 100 | PA4 100 | PA5 100 | PA1 100 |
| Organic halogen compound (B) (parts by mass) | Brominated polystyrene | 30 | 30 | 30 | 30 | — |
| | Brominated polyphenylene ether | — | — | — | — | — |
| Inorganic compound (C) (parts by mass) | Antimony trioxide | 10 | 10 | 10 | 10 | 10 |
| | Antimony pentoxide | — | — | — | — | — |
| | Sodium antimonate | — | — | — | — | — |
| Inorganic filler (D) (parts by mass) | Glass fiber | 100 | 100 | 100 | 100 | 100 |
| | Carbon fiber | — | — | — | — | — |
| Flame retardance | | V-0 | V-0 | V-0 | V-0 | V-2 |
| Physical properties of molded article | | | | | | |
| Tensile strength (MPa) | | 129 | 146 | 210 | 205 | 237 |
| Tensile elastic modulus (GPa) | | 16.5 | 160.4 | 17.5 | 16 | 18 |
| Bending strength (MPa) | | 210 | 201 | 352 | 354 | 380 |
| Bending elastic modulus (GPa) | | 14.4 | 12 | 15.5 | 15.4 | 15.1 |
| Charpy impact strength (kJ/m$^2$) | | 10.1 | 11.4 | 13.5 | 14.4 | 17.2 |
| High-temperature bending elastic modulus (GPa) | | 7.2 | 8.1 | 9.3 | 9.2 | 9.6 |
| Deflection temperature under load (° C.) | | 263 | 289 | 271 | 272 | 272 |
| Equilibrium water absorption (% by mass) | | 3.4 | 3.6 | 1.5 | 1.4 | 1.5 |

| | | Comparative Example | | | | |
|---|---|---|---|---|---|---|
| | | 6 | 7 | 8 | 9 | 10 |
| Polyamide (A) (parts by mass) | | PA1 100 | PA1 100 | PA1 100 | PA1 100 | PA1 100 |
| Organic halogen compound (B) (parts by mass) | Brominated polystyrene | — | 150 | 30 | 30 | 30 |
| | Brominated polyphenylene ether | — | — | — | — | — |
| Inorganic compound (C) (parts by mass) | Antimony trioxide | — | 10 | — | 70 | 10 |
| | Antimony pentoxide | — | — | — | — | — |
| | Sodium antimonate | — | — | — | — | — |
| Inorganic filler (D) (parts by mass) | Glass fiber | 100 | 100 | 100 | 100 | 250 |
| | Carbon fiber | — | — | — | — | — |
| Flame retardance | | V-2 | V-0 | V-1 | V-0 | — |
| Physical properties of molded article | | | | | | |
| Tensile strength (MPa) | | 259 | 92 | 223 | 123 | It was impossible to prepare pellets because of fuzzy strands. |
| Tensile elastic modulus (GPa) | | 18.5 | 9.1 | 17.9 | 14.2 | |
| Bending strength (MPa) | | 394 | 260 | 370 | 280 | |
| Bending elastic modulus (GPa) | | 16.2 | 11.9 | 15.2 | 12.5 | |
| Charpy impact strength (kJ/m$^2$) | | 19 | 6.2 | 15.1 | 7.1 | |
| High-temperature bending elastic modulus (GPa) | | 10.4 | 3.2 | 9.7 | 3.8 | |
| Deflection temperature under load (° C.) | | 272 | 248 | 271 | 265 | |
| Equilibrium water absorption (% by mass) | | 0.2 | 1.4 | 1.5 | 1.5 | |

PA6T: polyhexamethylene terephthalamide
PA46: polytetramethylene adipamide

It should be noted that, in Examples 8 to 10, the high-temperature bending elastic moduli were not measured.

As clear from Table 4, each of the molded articles of Comparative Examples 1 and 2 using the polyamide 6T or the polyamide 46 was found to have low mechanical strength and a low elastic modulus and had high equilibrium water absorption. A nylon 46 resin, which has conventionally been studied as a resin for an electronic part, is a resin obtained from tetramethylenediamine and adipic acid, and is excellent in heat resistance and mechanical properties. However, the resin contains an amide group at a higher ratio compared with usual polyamide resins such as a nylon 6 resin and a nylon 66 resin and hence has the drawback of high water absorption. Therefore, although the nylon 46 resin has excellent heat resistance and mechanical properties in a dry state, in actual use, the resin has a higher water absorption compared with usual polyamide resins and hence shows larger reductions in heat resistance and mechanical properties compared with the usual resins. Further, the high water absorption leads to a large change in dimension accordingly, and hence the dimensional accuracy is insufficient in some cases. Therefore, it is difficult to use the resin in parts required to have high accuracy. Moreover, due to a water absorption state, in mounting on a substrate in a surface mounting system, damage called blister appears on the surface of a part, resulting in significantly lowered performance and reliability of the part.

The polyamide (PA4) having a phosphorus atom concentration of 50 ppm or less has a large YI value, and hence the molded article obtained from the polyamide has a yellowish color and has a lowered commercial value (Comparative Example 3). Meanwhile, in the case of the polyamide (PA5) having a phosphorus atom concentration of 1,000 ppm or more, the molecular weight increased significantly during melt polymerization, and it was impossible to control the molecular weight (Comparative Example 4).

Further, each of the molded articles of Comparative Examples 5 and 6, in which no organic halogen compound (B) serving as a flame retardant was blended, was found to have low flame retardance. In addition, the molded article of Comparative Example 7, to which an excessive amount of the organic halogen compound (B) serving as a flame retardant was added, and the molded article of Comparative Example 9, to which an excessive amount of the inorganic compound (C) serving as a flame retardant aid was added, were found to be poor in mechanical properties.

The molded article of Comparative Example 8, to which no inorganic compound (C) serving as a flame retardant aid was added, was found to be poor in flame retardance compared with the molded article of Example 1.

Further, in the case of the resin composition to which an excessive amount of the inorganic filler (D) was added, fuzzy strands were produced in pelletization, and hence it was impossible to produce pellets (Comparative Example 10).

Meanwhile, in the case of each of the polyamide (PA1) to polyamide (PA3) used in Examples 1 to 11, the molecular weight was able to be controlled in melt polymerization. Further, the resultant resin was hardly colored, and the molded article formed was found to have excellent appearance. In addition, each of the molded articles of Examples 1 to 11 obtained by using the polyamide resins was found to have low water absorption and to be excellent in flame retardance, mechanical properties, and heat resistance.

Industrial Applicability

The flame-retardant polyamide resin composition of the present invention is excellent not only in flame retardance but also in a variety of physical properties such as moldability, mechanical properties, heat resistance, and low water absorbability, and can be suitably used in a wide range of applications and conditions as a molding material for a variety of industries and industrial and household products such as electrical and electronic parts, automotive parts, and mechanical parts required to have flame retardance.

The invention claimed is:

1. A flame-retardant polyamide resin composition, comprising:
    a polyamide (A) comprising a diamine unit comprising 70 mol % or more of a p-xylylenediamine unit, a dicarboxylic acid unit comprising 70 mol % or more of a linear aliphatic dicarboxylic acid unit comprising 6 to 18 carbon atoms, and a phosphorous atom concentration of 50 to 1,000 ppm;
    1 to 100 parts by mass of an organic halogen compound (B), based on 100 parts by mass of the polyamide (A);
    0.5 to 50 parts by mass an inorganic compound (C), based on 100 parts by mass of the polyamide (A); and
    0 to 100 parts by mass an inorganic filler (D), based on 100 parts by mass of the polyamide (A),
    wherein the polyamide (A) has a YI value of 10 or less in a color difference test in accordance with JIS-K-7105.

2. The composition of claim 1, wherein the linear aliphatic dicarboxylic acid unit comprises at least one selected from the group consisting of an azelaic acid unit, a sebacic acid unit, an undecanedioic acid unit, and a dodecanedioic acid unit.

3. The composition of claim 1, wherein the linear aliphatic dicarboxylic acid unit comprises at least one selected from the group consisting of a sebacic acid unit and an azelaic acid unit.

4. The composition of claims of claim 1, wherein the polyamide (A) comprises a diamine unit comprising 90 mol % or more of a p-xylylenediamine unit and a dicarboxylic acid unit comprising 90 mol % or more of at least one selected from the group consisting of a sebacic acid unit and an azelaic acid unit.

5. The composition of claim 1, wherein the polyamide (A) has a relative viscosity within a range of from 1.8 to 4.2.

6. The composition of claim 1, wherein the polyamide (A) has a number average molecular weight (Mn) within a range of from 10,000 to 50,000 in gel permeation chromatography, and a dispersivity (weight average molecular weight/number average molecular weight=Mw/Mn) within a range of from 1.5 to 5.0.

7. The composition of claim 1, wherein the organic halogen compound (B) comprises at least one selected from the group consisting of brominated polystyrene, brominated polyphenylene ether, brominated polycarbonate, a brominated bisphenol-type epoxy-based polymer, a brominated styrene maleic anhydride polymer, a brominated epoxy resin, a brominated phenoxy resin, decabromodiphenyl ether, decabromobiphenyl, a brominated crosslinked aromatic polymer, and perchlorocyclopentadecane.

8. The composition of claim 1, wherein the organic halogen compound (B) comprises at least one selected from the group consisting of brominated polystyrene and brominated polyphenylene ether.

9. The composition of claim 1, wherein the organic halogen compound (B) has a halogen atom content of 15 to 87% by mass.

10. The composition of claim 1, wherein the inorganic compound (C) comprises at least one selected from the group consisting of antimony trioxide, antimony pentoxide, sodium antimonate, tin oxide, iron oxide, zinc oxide, zinc borate, magnesium hydroxide, calcium hydroxide, calcium carbonate, and kaolin clay.

11. The composition of claim 1, wherein the inorganic compound (C) comprises at least one selected from the group consisting of antimony trioxide, antimony pentoxide, and sodium antimonate.

12. The composition of claim 1, wherein the inorganic filler (D) comprises at least one selected from the group consisting of a glass fiber, a glass bead, a carbon fiber, a boron fiber, talc, mica, silica, silica alumina, alumina, graphite, kaolin, titanium dioxide, and molybdenum disulfide.

13. The composition of claim 1, wherein the inorganic filler (D) comprises at least one selected from the group consisting of a glass fiber and a carbon fiber.

14. A molded article, comprising:
the composition of claim 1.

15. The molded article claim 14, which is an electrical part or an electronic part.

16. The composition of claim 1, the polyamide (A) has a phosphorus atom concentration of 50 to 400 ppm and a YI value of 6 or less in a color difference test in accordance with JIS-K-7105.

17. The composition of claim 1, wherein the linear aliphatic dicarboxylic acid unit comprises a sebacic acid unit.

18. The composition of claim 1, wherein the linear aliphatic dicarboxylic acid unit comprises an azelaic acid unit.

19. The composition of claim 1, wherein the organic halogen compound (B) comprises brominated polystyrene.

20. The composition of claim 1, wherein the organic halogen compound (B) comprises brominated polyphenylene ether.

* * * * *